Jan. 15, 1963 D. TANN 3,073,656
SELF-LUBRICATED BALL BEARING
Filed Dec. 21, 1960

INVENTOR
DAVID TANN
BY Lane & Aitken
ATTORNEYS

United States Patent Office 3,073,656
Patented Jan. 15, 1963

3,073,656
SELF-LUBRICATED BALL BEARING
David Tann, Detroit, Mich., assignor to The Tann Corporation, Detroit, Mich., a corporation of Michigan
Filed Dec. 21, 1960, Ser. No. 77,304
8 Claims. (Cl. 308—187)

The present invention relates to self-lubricating bearings and particularly to a self-lubricated bearing such as a ball or roller bearing having an inner race rotatably journaled within an outer race by a plurality of circumferentially spaced rolling elements disposed therebetween.

It is one object of the invention to lubricate a ball or roller bearing by providing a continuous supply of a bearing oil directly to the balls or rollers of the bearing.

It is another object of the invention to lubricate a ball or roller bearing as described above by providing a special cage that circumferentially spaces the rolling elements from one another and provides an enclosed reservoir about the rolling elements which is filled with an oil-impregnated wicking material to deliver the oil directly to the rolling elements.

It is a further object of the invention to provide a bearing having a special cage filled with an oil-impregnated wicking material disposed about the rolling elements thereof as described above wherein the rolling of the rolling elements relative to the cage creates a pumping action that helps draw the oil out of the wicking material and onto the surface of the rolling elements.

It is a still further object of the invention to provide a bearing having the special bearing cage as described above wherein the oil drawn from the wicking material and deposited on the surface of the rolling elements to lubricate the loaded bearing surfaces is recirculated back into the wicking material within the bearing cage.

Other objects and features of novelty of the present invention will be specifically pointed out or will otherwise become apparent when referring, for a better understanding of the invention, to the following description taken in conjunction with the accompanying drawings, wherein.

Figure 1:
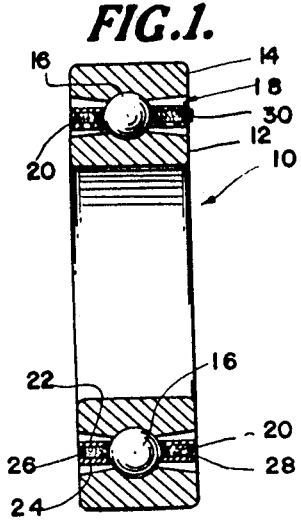
FIG. 1 is a sectional view of a ball bearing embodying features of the present invention.

Referring to FIG. 1, one embodiment of the present invention is illustrated in the form of a ball bearing 10 having an inner race 12 and outer race 14 rotatably journaled together in a conventional manner by a plurality of balls 16. In accordance with the present invention a cage 18 is provided for spacing the balls circumferentially between the two races which forms a housing for retaining an oil-impregnated wicking material 20 for lubricating each of the balls 16.

It will be observed that the cage comprises an inner cylindrical wall 22 and an outer cylindrical wall 24 joined together by spaced circular end walls 26 and 28. Each of the cylindrical walls 22 and 24 has a plurality of circumferentially spaced circular apertures therein for supporting each of the balls 16 as illustrated. Since the balls, although freely rotatable, fit relatively closely within the apertures, they close off the housing to provide an enclosed reservoir for the oil-impregnated wicking material 20. With this construction the wicking material 20 contacts the surface of each of the balls along an annular band to supply the bearing oil directly to the balls.

The oil-impregnated wicking material is preferably of the type disclosed in the application of Martin L. Abel, Serial No. 526,757, filed August 5, 1955, now Patent No. 2,966,459, issued on December 27, 1960. This patented wicking material briefly comprises finely macerated cellulose fibers which retain large quantities of bearing oil. Substantially all of the cellulose fibers are 3.5 millimeters or less, which enables the oil-impregnated wicking material to be injected under pressure through small apertures into reservoirs such as that provided by the bearing cage 18. This patented material will hereinafter be referred to as injectable wicking material. One or more removable plugs 30 may be suitably positioned along the bearing cage to cover apertures for injecting the oil-impregnated injectable wicking material into the bearing cage 18. With this construction each of the balls is effectively supplied with oil from the injectable wicking material 20 to lubricate the loaded bearing surfaces between the balls and the inner and outer races. Since the injectable wicking material such as that of the above mentioned co-pending application retains such large quantities of bearing oil, the bearing will be lubricated in this manner for a fairly long period of time. However, if additional oil is needed to replenish the injectable wicking material, it can be added through the apertures covered by the removable plugs 30.

The rotation of the balls past the annular opening of the bearing cage communicating with the balls along the aforementioned annular bands thereof creates a pumping action which tends to help draw the oil out of the injectable wicking material onto the surface of each of the balls. This pumping action is similar to that provided in a conventional sleeve bearing having a window therein for delivering lubricant to the surface of a rotatable shaft supported within the sleeve bearing, it being a well-known phenomenon that the rotation of the shaft creates a pumping action that tends to draw the oil through the window and onto the surface of the rotatable shaft.

Figure 2:
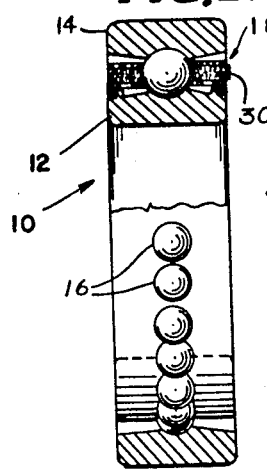
FIG. 2 is a sectional view similar to FIG. 1, with the bearing cage partially extended, illustrating a modification of the present invention.
Figure 4:
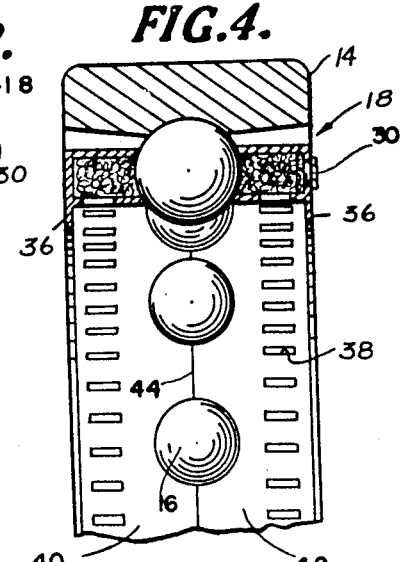
FIG. 4 is a fragmentary sectional view similar to FIG. 3 with the inner race removed to more clearly illustrate the inner surface of the bearing cage.
Figure 3:
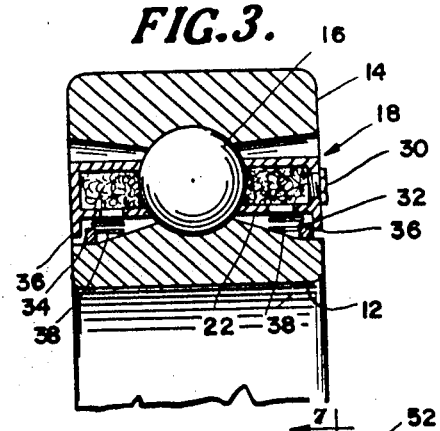
FIG. 3 is an enlarged sectional fragmentary view of the upper portion of FIG. 2.

Referring to FIGS. 2–4, another form of the present invention is illustrated which provides a recirculation feature to recirculate oil deposited on the ball back into the reservoir within the bearing cage 18. To accomplish this the inner race 12 is provided with a pair of radially projecting oil slingers 32 and 34 adjacent to each end thereof, and each of the slingers 32 and 34 is overlapped by a radially inwardly extending lip 36 on the bearing cage 18. Assuming that a rotating shaft is to be supported in the inner race so that the inner race rotates and the outer race 14 is held stationary, oil which tends to escape from the balls and work its way axially outwardly along the outer surface of the inner race will be stopped by the oil slingers 32 and 34 and thrown radially outwardly thereby due to centrifugal forces. The inwardly extending lips 36 prevent the escape of any oil outwardly of the slingers, and the inner cylindrical wall 22 of the bearing cage is made pervious to the passage of oil therethrough in any suitable manner, such as by making the wall of porous sintered material or by forming a plurality of axially extending slits 38 therein overlying the oil slingers, so that the oil thrown thereagainst by the slingers will be returned to the injectable wicking material within the bearing cage 18. With this construction most of the oil supplied to the balls 16 is recirculated through the inner wall 2 and back into the bearing cage 18 to maintain the supply of oil in the injectable wicking material and thus ensure that the bearing will be lubricated over long periods of time, if not for the entire life of the bearing.

Figure 5:
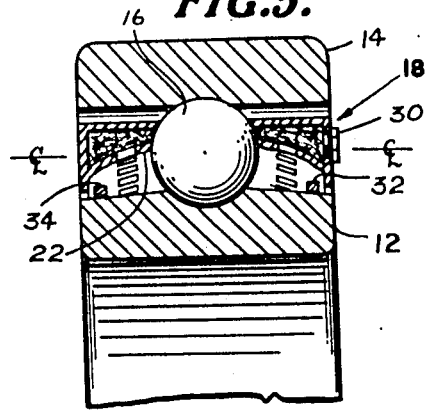
FIG. 5 is a fragmentary sectional view similar to FIG. 3 illustrating another modification of the present invention.

Referring to FIG. 5, another modification of the invention is illustrated wherein the inner wall 22 of the bearing cage is tapered inwardly so that it increases in diameter as it approaches the balls. With this construction, as the oil is thrown radially outwardly by the oil slingers 32 and 34, as previously described, it will strike the tapered surface of the inner wall 22 and work its way inwardly toward the balls under the influence of the centrifugal force created by the bearing cage as it rotates, it being noted that in ball bearings of this type the cage always rotates, although at a slightly lower speed than that of the rotating race. As the oil moves inwardly along the wall 22, it will flow through the slits 38 and be returned to the injectable wicking material 20. Of course, if the inner wall 22 were not pervious to the oil on the surface thereof, the oil would still be returned directly to the surface of the balls and thus still enhance the lubrication thereof.

It will also be observed in FIG. 5 that the inner wall 22 and outer wall 24 both engage the balls 16 along the outer halves thereof beyond the center lines of the balls. With this construction the bearing cage 18 can be made in one piece if desired and each of the balls separately fitted therein afterwards, since the bearing cage does not have to slip over the major diameter of the balls. In the case of the embodiments described in FIGS. 1-4, the bearing cage does engage the balls on both sides of the major diameters thereof so that it would have to be formed about the balls to provide an assembly of the cage and the balls, or made in two separate halves 40 and 42, as most clearly illustrated in FIG. 4, which meet along the circumferential line 44 extending along the diameters of each of the balls. It is apparent that if the bearing cage is split along the line 44 in this manner, it can be made in two separate pieces which can easily be fitted together about each of the balls 16.

Figure 6:
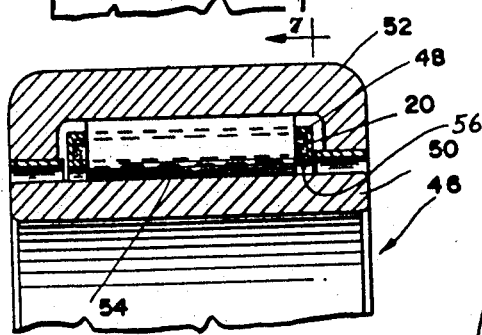
FIG. 6 is an enlarged fragmentary sectional view similar to FIG. 3 illustrating the present invention as applied to a roller bearing.
Figure 7:
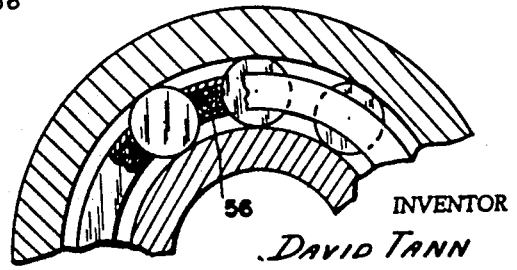
FIG. 7 is a sectional view taken along the line 7—7 of FIG. 6.

Referring to FIGS. 6 and 7, a roller bearing 46 is illustrated which is lubricated by a bearing cage 48 filled with the oil-impregnated injectable wicking material 20. The roller bearing comprises a conventional inner race 50 and outer race 52 rotatably separated by a plurality of rollers 54. The bearing cage 48 forms an annular housing providing an enclosed reservoir about each of the rollers 54 in substantially the same manner that the bearing cage 18 provides an enclosed reservoir about each of the balls 16 in the previous embodiments. Suitable apertures (not shown) may be provided in the inner cylindrical wall 56 of the bearing cage between one or more pairs of the rollers 54 to enable the oil-impregnated injectable wicking material to be injected into the bearing cage, as previously described, and also to enable the oil to be replenished, if needed. Of course the inner race 50 will have to be shifted a sufficient distance axially either to the right or the left to uncover the apertures to facilitate this injection, and the apertures would also be covered with removable plugs such as the plugs 30 to prevent the escape of the injectable wicking material.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:
1. A self-lubricating bearing comprising an inner race, an outer race, a plurality of rolling elements disposed between said races to rotatably journal the inner race within the outer race, and a cage engaging said rolling elements to maintain them in circumferentially spaced relation without interfering with their rolling action, said cage comprising an annular housing having openings therein communicating the inside thereof directly with each of said elements, an oil-impregnated wicking material filling said housing, and an oil slinger fixed to each end of said inner race in position to throw oil working its way toward the ends of the inner race radially outwardly against the inner wall of said bearing cage, said inner wall of the bearing cage being pervious to the passage of oil therethrough whereby the oil thrown radially outwardly by the oil slingers can pass through the pervious wall of the bearing cage and back into the reservoir to replenish the wicking material.

2. The invention as defined in claim 1 including an annular lip extending radially inwardly from each end of the bearing cage and overlapping the oil slinger adjacent thereto on the outer side thereof.

3. The invention as defined in claim 1 wherein the inner surface of the bearing cage is tapered so that the diameter thereof increases as it approaches the rolling elements whereby oil thrown radially outwardly thereagainst by the oil slingers will work its way inwardly toward the rolling elements due to the centrifugal force created by the rotation of the bearing cage.

4. The invention as claimed in claim 3 wherein the walls defining said opening in the bearing cage engage each of the rolling elements on the radially outer halves thereof so as to lie on the same side of the major diameter of each of the rolling elements whereby the elements can be positioned in the openings after the housing has been completely formed.

5. A self-lubricating bearing comprising an inner race, an outer race, a plurality of rolling elements disposed between said races to rotatably journal the inner race within the outer race, and a cage engaging said rolling elements to maintain them in circumferentially spaced relation without interfering with their rolling action, said cage being adapted to retain and supply bearing oil directly to the rotating elements, and an oil slinger secured to each end of said inner race to throw oil working its way toward the ends of the inner race radially outwardly against the inner wall of said bearing cage, said inner wall being tapered to increase in diameter as it approaches the rolling elements so that oil thrown on the surface thereof will work its way toward the rolling elements due to the centrifugal force created by the rotating cage.

6. A method of supplying bearing oil to a plurality of rolling elements adapted to rotatably journal an inner race within an outer race, which includes the steps of: forming an annular housing having inner and outer radially spaced generally cylindrical walls to provide an enclosed reservoir, providing a plurality of circumferentially spaced apertures in each of said walls, rotatably supporting a plurality of rotating elements in said housing with each of said elements projecting through an aperture in each of said walls so as to close off the reservoir within the housing, and injecting an oil-impregnated wicking material into said housing after the rolling elements have been rotatably mounted therein to close off said apertures.

7. A method of making a self-lubricating bearing cage assembly, which includes the steps of, forming an annular housing having spaced opposed annular walls with a plurality of circumferentially spaced apertures in each of said walls, rotatably supporting a plurality of rolling elements in said housing with each of said elements projecting through an aperture in each of said walls so as to close off the reservoir within the housing, and injecting an oil-impregnated wicking material into said housing after the rolling elements have been rotatably mounted therein to close off said apertures.

8. A method of making a bearing cage assembly, which includes the steps of, forming an annular housing having spaced opposed annular walls with a plurality of circumferentially spaced apertures in each of said walls, sealing said apertures to define a substantially enclosed reservoir in said housing, and injecting an oil-impregnated wicking material into said housing for lubricating a plurality of rolling elements rotatably supportable in said housing with each of said elements projectable through an aperture in each of said walls.

References Cited in the file of this patent
UNITED STATES PATENTS

| | | |
|---|---|---|
| 2,029,445 | Schubert | Feb. 4, 1936 |
| 2,117,550 | Eynon et al. | May 17, 1938 |
| 2,987,350 | Hay | June 6, 1961 |